Figure 5:
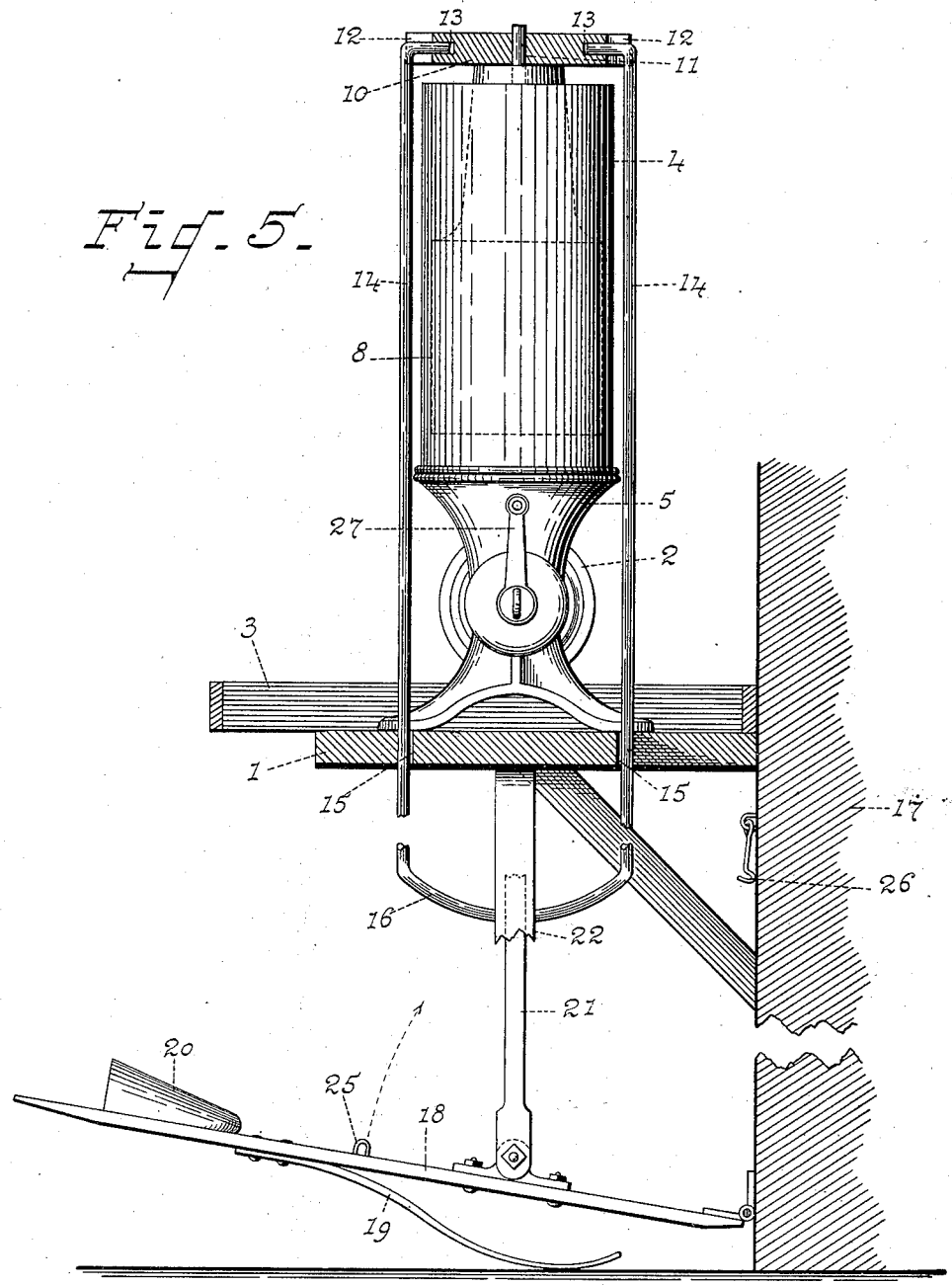

No. 655,822. Patented Aug. 14, 1900.
T. W. CLEMENTS.
FEEDING ATTACHMENT FOR MEAT CUTTERS AND SAUSAGE STUFFERS.
(Application filed Dec. 18, 1899.)
(No Model.) 2 Sheets—Sheet 1.
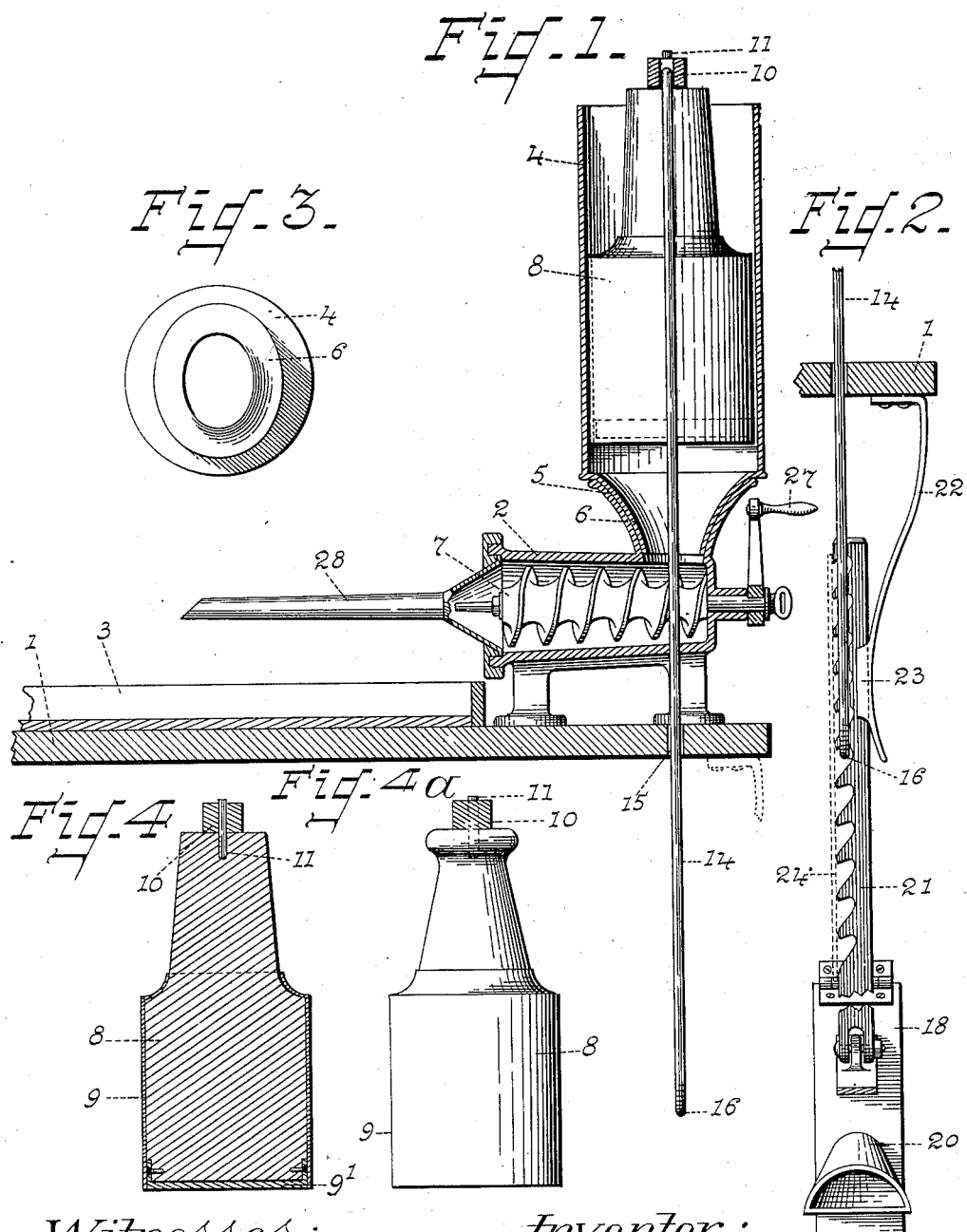

No. 655,822. Patented Aug. 14, 1900.
T. W. CLEMENTS.
FEEDING ATTACHMENT FOR MEAT CUTTERS AND SAUSAGE STUFFERS.
(Application filed Dec. 18, 1899.)

(No Model.) 2 Sheets—Sheet 2.

Witnesses:
George W. Denham
Cicero J. Kane

Inventor:
Thomas W. Clements,
by Frank R. Rathbun,
Attorney.

UNITED STATES PATENT OFFICE.

THOMAS W. CLEMENTS, OF AUBURN, NEW YORK.

FEEDING ATTACHMENT FOR MEAT-CUTTERS AND SAUSAGE-STUFFERS.

SPECIFICATION forming part of Letters Patent No. 655,822, dated August 14, 1900.

Application filed December 18, 1899. Serial No. 740,702. (No model.)

*To all whom it may concern:*

Be it known that I, THOMAS W. CLEMENTS, a citizen of the United States, and a resident of Auburn, county of Cayuga, State of New York, have invented a new and useful Improvement in Attachments for Meat-Cutters and Sausage-Stuffers, of which the following is a specification, reference being had to the accompanying drawings, on two sheets, making part of this specification.

My invention is more particularly applicable to that class of meat-cutters which ordinarily consists of a slightly-tapered cylinder or case in which is rotated a screw which forces the bits of meat against a cutter or cutters and which may also be used in combination with a tube or spout for filling sausage-cases, the meat being passed to the said screw through a hopper extended from the cylinder, its inlet being in close proximity to the rotating screw. Ordinarily the bits of meat are passed into the hopper by hand, and there is nothing to prevent foreign substances from being mingled therewith, and, besides, as the meat is pressed downward onto the screw there is a possibility of accidental injury to the hand of the operator. Another objection has presented itself in the filling of sausage-cases in that it usually requires one person to attend to the cases as they are filled from the spout aforesaid and another person to feed the meat into the hopper and operate the forcing-screw of the machine. I aim to obviate these objections by providing an attachment which shall effectually prevent the admission of foreign matter and which will enable a single person to operate the machine, feed the material thereto, and at the same time attend the sausage-case as it is being filled when the said meat-cutter is arranged for the purpose of a sausage-stuffer or as a sausage-stuffer and meat-cutter combined, as is not infrequently the case. I attain these objects by the mechanism illustrated in the accompanying drawings, on two sheets, in which—

Figure 1 is a vertical section of a meat-cutter such as I have mentioned converted into a sausage-stuffer and shows my attachment placed thereon also in section and in working position. Fig. 2 is a view of the operating mechanism connected with and forming a part of my attachment, but shown separately for the want of vertical space as well as to preserve the scale of the drawing of sufficient size. Fig. 3 is a bottom end view of the meat receptacle or reservoir, showing the same adapted to fit into the hopper of the machine. Fig. 4 is a vertical section of the piston or plunger, which is arranged to travel vertically in the meat receptacle or reservoir. Fig. 4$^a$ is a modification in its structural outline of Fig. 4. Fig. 5, Sheet 2, is an end elevation of Fig. 1 and the operative mechanism, the several continuous parts being broken away between the shelf on which the machine rests and the floor for want of space.

Similar figures of reference refer to similar parts throughout the several views.

In Fig. 1, 1 represents the main shelf or table on which the machine 2 is secured in desired position.

3 is a movable shelf or table on which the cut meat or the sausage-cases are carried.

4 is a meat receptacle or reservoir and consists of an elongated cylinder open at its top end and at its bottom end tapered to the shape and inner contour of the hopper 5 of the machine 2. It will be seen by referring to Fig. 1 that the tapered end 6 of the said meat-receiver 4 opens directly upon the forcing-screw 7 of the machine 2, when the said meat-receiver is in the position described ready for the reception of the meat. It will also be seen that I have represented the said meat-receiver 4 of a cylindrical form, but it, as well as the piston or plunger hereinafter described, may be of any other desired shape, if it is deemed expedient, without interfering with the operation of the several parts connected therewith.

Again referring to Fig. 1, a piston 8 is fitted somewhat loosely to the inside of the meat-receiver 4 for a portion of its bottom length, the remaining upper portion being tapered away to secure lightness and symmetry. The top end of said piston 8 may be provided with a beading, as shown in Fig. 4$^a$, so the hands may not slip thereon when it is necessary to withdraw the same from the meat-receiver, if it is desired to be thus made. The bottom portion of the piston 8, as well as the bottom surface of the same—that is, if the piston 8 be made of wood—is sheathed with a metal covering, as seen at 9 and 9', respectively. It will also be seen that the said piston can be made entirely of metal and the interior cored out and an equal degree of lightness and cleanliness preserved, if it is so desired. Its form may also be modified in various ways, so long as a portion of its bottom length nearly fills the cross-section horizontally of the meat-receiver.

On the top end of the piston 8 I provide a cross-bar 10, which is pivoted thereon by a pivot-bolt 11, passing down into the end of the piston, as seen in Fig. 4. The ends of the cross-bar 10 extend beyond the exterior sides of the meat-receiver 4 and are provided with slots 12 12 and with horizontal holes 13 13 at the inner ends of the said slots, in which the connecting-rods 14 14, hereinafter described, are hooked. The connecting-rods 14 14 (see Fig. 5) are continued downward from the cross-bar 10 on the outer side of the meat-receiver 4 through slots 15, provided in the main shelf 1, for a sufficient operative distance and there united, as seen at 16.

On a line nearly vertical with the center of the meat-receiver and a short distance from the floor I hinge to a block, the wall 17, or some such convenient place a foot-tread 18. (See Figs. 2 and 5.) On the under side of the foot-tread 18 is provided a flat spring 19, something after the shape shown, the purpose of which is evident. A toe-piece 20 is provided near the outer end of the foot-tread 18, so a portion of the foot of the operator may enter therein and be assured of its place.

Referring to Fig. 2, on the foot-tread 18 and slightly to one side of a vertical line drawn between the connecting-rods 14 is loosely pivoted on an ear 20 of the foot-tread 18 the lower end of the notched rack-piece 21, which extends upward sufficiently to hook on the union end 16 of the connecting-rods 14 when they are drawn to their greatest operative height, which takes place when the meat-receiver is filled. So the notched rack-piece 21 may be assured its verticality and of hooking on the union end 16 I have provided a guide-spring 22, (see Fig. 2,) which is fastened at one end to the under side of the main shelf 1 and shaped as seen, and further provided near its impact end on the said rack-piece 21 with ears 23, which turn on either side thereof and serve to keep said rack-piece in desired place.

It will be seen by referring to Fig. 2 and the dotted lines 24 that a flat spring may be fastened to the lower end of the rack-piece 21 and extend upwardly on the points of the notches and on the outer side of the union end 16, and thus hold the said rack-piece in proper place for action; but the top end of said spring 24 being free of necessity the constant hooking and unhooking of the rack-piece from the loop causes much unnecessary noise and I have preferred the arrangement already described. A staple 25 is also provided on the foot-tread, in which a conveniently-placed hook 26 may hook when it is desired to swing the foot-tread up and out of the way, the track of which is represented by the curved arrow, which action is desirable when the attachment is not in operation.

Having thus described in detail the several parts of my attachment, I will now proceed to set forth the operation of the same.

When it is desired to fill cases or guts with sausage-meat, the machine is stripped of its meat-cutting accessories and a spout or filler 28, as seen in Fig. 1, secured on the outlet end thereof. As much cut meat as desired is put in the meat-receiver, which is then placed on the hopper of the machine, its tapered end extending immediately downward and over the forcing-screw of the machine, as already described. The larger end of the piston is now entered into the meat-receiver and pressed downward until its lower end comes in contact with the contents of the receiver. The cross-bar of the piston is next adjusted and the top ends of the connecting-rods hooked therein after they have been passed through the slots in the main shelf. The notched rack-piece is next adjusted in its guide-spring and hooked on the union end 16 of the connecting-rods, when the attachment is ready for working. The operator now places his foot in the toe-piece of the foot-tread and presses downward. This action causes the piston to force the meat through the taper end of the meat-receiver directly on the forcing-screw, which while being turned by the operator by the medium of a hand-crank 27 attached thereon leaves his remaining hand free to regulate and arrange the cases being filled. When the foot-tread reaches the floor, the operator allows it to retract on the spring 19, and the notched rack-piece rehooks itself in the union end of the connecting-rods, the action being repeated until all of the contents of the meat-receiver is forced into the machine, thus assuring a cleanly and convenient means for one person to supply the machine with material and control the filling-cases.

Having thus described my attachment and its operation, what I claim as new, and desire to secure by Letters Patent of the United States, is—

1. In a feeding attachment for meat-cutters and sausage-stuffers, a meat-receiver having a tapered end adapted to fit in the hopper of the machine and extending downward nearly to the forcing-screw of the same; a piston inside of said meat-receiver having a pivoted cross-bar at the top end; a hinged foot-tread having a spring at its under side and a notched rack-piece pivoted thereon, and connecting-rods between said pivoted cross-bar and said notched rack-piece substantially in the manner and for the purpose herein described and shown.

2. In a feeding attachment for meat-cutters and sausage-stuffers, a meat-receiver having a tapered end adapted to fit in the hopper of the machine and extending downward nearly to the forcing-screw of the same, combined with a piston having a pivoted crossbar at its top end adapted at either end to engage with the top ends of connecting-rods passing on the outer side of said meat-receiver, said connecting-rods being united below the machine and engaging on a vertical notched rack-piece pivoted on and adapted to be operated by a hinged foot-tread substantially in the manner and for the purpose herein described and shown.

3. In a feeding attachment for meat-cutters and sausage-stuffers, a meat-receiver having a tapered end adapted to fit in the hopper of the machine and extending downward nearly to the forcing-screw of the same; a piston movable in said meat-receiver having a pivoted cross-bar at its top end adapted at either end to engage with the top ends of connecting-rods passing on the outer side of said meat-receiver and united below the said machine, combined with a vertical notched rack-piece adapted to be carried vertically against the united ends of said connecting-rods by a suitably-arranged spring and pivoted on a hinged foot-tread having a reactive spring at one side thereof substantially in the manner and for the purpose herein described and shown.

In testimony whereof I have hereunto set my hand at Auburn, county of Cayuga, State of New York, this 15th day of December, A. D. 1899.

THOMAS W. CLEMENTS.

Witnesses:
 H. T. KEELER,
 WALTER S. CROWNINSHIELD.